O. KRELL.
OPTICAL INSTRUMENT FOR DETERMINING THE DIRECTION OF TRAVEL OF AIR SHIPS AND THE LIKE.
APPLICATION FILED AUG. 27, 1908.
940,329.
Patented Nov. 16, 1909.
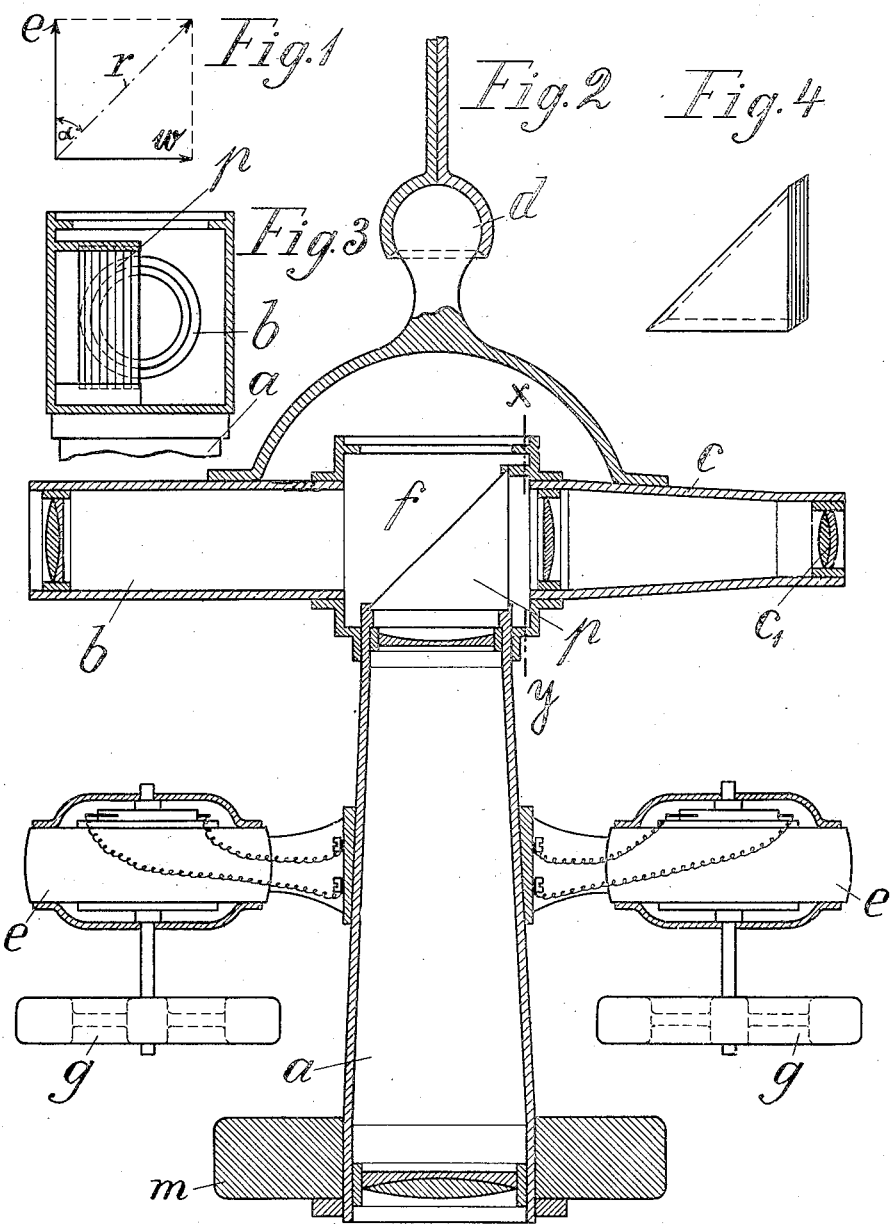
Witnesses
H H Knight
Octavius Knight
Inventor
Otto Krell
by
Attys

UNITED STATES PATENT OFFICE.

OTTO KRELL, OF CHARLOTTENBURG, GERMANY, ASSIGNOR TO SIEMENS-SCHUCKERT-WERKE G. M. B. H., OF BERLIN, GERMANY, A CORPORATION OF GERMANY.

OPTICAL INSTRUMENT FOR DETERMINING THE DIRECTION OF TRAVEL OF AIR-SHIPS AND THE LIKE.

940,329.　　　Specification of Letters Patent.　　Patented Nov. 16, 1909.

Application filed August 27, 1908. Serial No. 450,553.

*To all whom it may concern:*

Be it known that I, OTTO KRELL, a subject of the German Emperor, and residing at Charlottenburg, near Berlin, Germany, have invented a certain new and useful Optical Instrument for Determining the Direction of Travel of Air-Ships and the Like, of which the following is a specification.

The subject-matter of the present invention is an optical instrument for determining the direction of travel of air-ships, motor-driven balloons and the like.

When traveling in motor-driven balloons it is not at once possible to determine the direction in which the balloon is moving with regard to the earth. Since the motor-driven balloon, just as any ordinary free balloon, is driven by the wind, the movement of the motor-driven balloon is, generally speaking, the speed which results from the speed of the balloon itself due to the motor and from the speed of the wind. Now this resultant only passes through the longitudinal axis of the balloon during a calm or when the balloon travels exactly with or exactly against the wind. In every other instance the direction of motion of the balloon is at a certain angle to the longitudinal axis of the motor-driven balloon. For reaching a certain goal it is therefore necessary to exactly determine the direction of this resultant, and to provide an optical instrument for this purpose is an important object of the present invention.

In order that the invention may be clearly understood reference will be made to the accompanying drawing in which one embodiment is represented by way of example, and in which:

Figure 1 is a diagram more clearly explained hereafter; Fig. 2 is an elevation, partly in section, of an entire instrument according to the invention; Fig. 3 is a section in the plane $x$—$y$ in Fig. 2 through the prism-box of the instrument, whereas Fig. 4 shows in perspective the prism which is employed.

Referring to the drawing, and firstly to Fig. 1, the direction of the resultant $r$ is here shown which results from the velocity $e$ of the balloon due to its motor and from the velocity $w$ of the wind, this resultant $r$ being at an angle $x$ to the longitudinal axis of the balloon.

Referring to Fig. 2, the instrument consists of a device which simultaneously admits of the horizon being observed, as well as objects on the earth vertically under the air-ship and their apparent movement. The vertical objective-tube $a$ of a vertical telescope and the horizontal objective-tube $b$ of a horizontal telescope are mounted on a frame or box $f$ and have a common eye-piece tube $c$ provided with an eye-lens $c_1$. The image of the objects on the earth which is produced in the vertical telescope $a$ is thrown by a glass prism or a mirror $p$ into the eye-lens $c_1$ in such manner that this image only covers half the field of view of the horizontal telescope $b$. The points on the horizon can be observed directly through the telescope $b$, $c$. In the portion of the field of vision occupied by the prism $p$ there are lines arranged in such manner that they are in vertical planes running parallel to the axis of the horizontal telescope $b$. In the example shown in Figs. 3 and 4 these lines are marked on the vertical face of the prism itself, but they may be provided otherwise. Now when the balloon moves, the objects on the earth appear to run through the field of vision of the telescope, and it is only necessary to turn the horizontal telescope until the apparent direction of motion of the objects on the earth coincides with the direction of the lines arranged in the field of vision in the telescope. The axis of the horizontal telescope will then be situated exactly in the direction of motion, whether forward or backward, of the balloon, and consequently one can continuously see through the telescope the point on the horizon toward which the balloon is moving in consequence of the combined movements due to its own velocity and the velocity of the wind. Now in order that the oscillations of the balloon may not disturb observations with the instrument, the latter is suspended cardanically by means of a universal or ball-and-socket joint $d$ or in other manner. In order to shield the instrument from disturbing motions of the balloon, one or more gyroscopes $g$ are arranged on the instrument which are driven by electric motors $e$ for example. Approximately the same result as that obtained by a gyroscope can also be had by the center of gravity of the instrument being placed as low as possible under the cardanic suspension. For this purpose a special weight m is placed at the lowest part of the telescope a.

What I claim as my invention and desire to secure by Letters Patent is:

1. An optical instrument of the character described having means for observing simultaneously a point below and a point on the horizon, and lines within the instrument coinciding with the direction of the apparent motion of the point below when such direction coincides with the point on the horizon.

2. An optical instrument comprising two telescopes, an eye-piece tube common to both, and a plurality of lines in its field of vision, one of said telescopes permitting observation of a point below, and the other telescope permitting observation of a point on the horizon and said lines coinciding with the direction of the apparent motion of the point below when such direction coincides with the point on the horizon.

3. In an optical instrument, the combination of a frame, a horizontal objective-tube mounted thereon, a vertical objective-tube on said frame, an eye-piece tube on said frame, which is common to said objective-tubes, and a glass prism in said frame having a plurality of lines thereon occupying part of the field of vision in said eye-piece tube, said lines being arranged in vertical planes parallel to the axis of said horizontal objective-tube.

4. In an optical instrument, the combination, with cardanic suspension means, of a frame, a horizontal objective-tube mounted thereon, a vertical objective-tube on said frame, a common eye-piece tube on said frame, and a glass prism in said frame having a plurality of lines thereon occupying part of the field of vision in said eye-piece tube, said lines being arranged in vertical planes parallel to the axis of said horizontal objective-tube.

5. In an optical instrument, the combination, with cardanic suspension means, of a frame, a horizontal objective-tube mounted thereon, a vertical objective-tube on said frame, an eye-piece tube on said frame, common to said objective-tubes, a glass prism in said frame having a plurality of lines thereon occupying part of the field of vision in said eye-piece tube, said lines being arranged in vertical planes parallel to the axis of said horizontal objective-tube, and a gyroscope mounted on said vertical objective-tube.

6. In an optical instrument, the combination of a frame, a horizontal objective-tube mounted thereon, a vertical objective-tube on said frame, a common eye-piece tube on said frame, a glass prism in said frame having a plurality of lines thereon occupying part of the field of vision in said eye-piece tube, said lines being arranged in vertical planes parallel to the axis of said horizontal objective-tube, a universal joint attached to said horizontal objective-tube and to said eye-piece tube for suspending the instrument, and an electrically driven gyroscope mounted on said vertical objective-tube.

7. In an optical instrument, the combination of a frame, a horizontal objective-tube mounted thereon, a vertical objective-tube on said frame, an eye-piece tube on said frame, common to said objective-tubes, a glass prism in said frame having a plurality of lines thereon occupying part of the field of vision in said eye-piece tube, said lines being arranged in vertical planes parallel to the axis of said horizontal objective-tube, a universal joint attached to said horizontal objective-tube and to said eye-piece tube, and a weight attached to the lower end of said vertical objective-tube, substantially as shown.

In testimony whereof I have signed my name to this specification in the presence of two witnesses.

OTTO KRELL.

Witnesses:
WOLDEMAR HAUPT,
ARTHUR SCHROEDER.